UNITED STATES PATENT OFFICE.

JOHN WIRGOVITS, OF NEW YORK, N. Y., ASSIGNOR, BY DIRECT AND MESNE ASSIGNMENTS, OF ONE-THIRD TO HENRY HELLER AND ONE-THIRD TO GLENN M. SMITH, ALL OF NEW YORK, N. Y.

ALUMINUM-SOLDER.

941,835. Specification of Letters Patent. Patented Nov. 30, 1909.

No Drawing. Application filed April 3, 1909. Serial No. 487,607.

*To all whom it may concern:*

Be it known that I, JOHN WIRGOVITS, a subject of the Emperor of Austria-Hungary, and resident of New York, in the county and State of New York, have invented certain new and useful Improvements in Aluminum-Solder, of which the following is a specification.

This invention relates to a composition or alloy for soldering aluminum, by the use of which an exceedingly strong and permanent joint between the parts soldered is produced. The solder may also be employed for soldering together one part of aluminum and another of a metal of a different nature when desired.

I have found that best results are attained where acid is not employed, it being well known that where acid is used in connection with an aluminum solder, the use of the article thus soldered in salt water or in connection with a contained liquid in which salt is present results in the destruction of the soldered joint by reason of the action of the salt upon the acid. I therefore use no acid, my improved solder consisting essentially of an alloy of tin, copper and zinc, with the tin greatly predominating.

I find that the best results are attained by use of the above-named ingredients in substantially the following proportions: tin 76.116%, copper 2.096%, zinc 21.788%. These proportions may be varied within safe limits, the tin and zinc being in the proportion of substantially three and one-half to one, and that of the zinc and copper being substantially ten to one. In order that these metals may be formed into a solder, care must be taken in preparing them. I proceed as follows:—I first melt the tin and then add the copper and then, after these two metals have run together, I add the zinc and melt all together, after which the alloy may be run into sticks of solder or molded in any of the well-known ways to be afterward employed as are ordinary sticks of solder. I preferably employ the copper in the form of filings or small particles, so that the same will melt more readily and thus avoid any danger of burning the tin which melts at a lower temperature. I may sometimes add a small proportion of aluminum, reducing the quantity of tin proportionately.

In use, the parts to be soldered are heated in any of the well-known ways, and then the stick of solder is placed upon the heated parts, keeping the latter heated; the heat of the parts melts the solder which flows readily, no acid or resin being required, and, as soon as the solder is placed on the parts, the latter are clamped or pressed together and quickly cooled.

I have found that the alloy hereinbefore described is most efficient for the purpose, the action of the copper in the proportions specified serving to change the surface of the aluminum so that the solder sticks and the parts united become practically as one solid homogeneous mass.

What I claim as new is:—

1. An alloy for soldering aluminum, the same composed of over sixty per cent. tin, less than thirty per cent. zinc, and a small per cent. of copper.

2. An aluminum solder composed of tin, copper and zinc, the tin and zinc being in the proportion of substantially three and one-half to one, and that of the zinc and copper being substantially ten to one.

Signed by me at New York, N. Y., this second day of April 1909.

JOHN WIRGOVITS.

Witnesses:
FRANK BRODSKY,
ERNEST CIZEK.